E. BUSWELL & T. CASCADEN, Jr.
FERTILIZER DISTRIBUTER.
APPLICATION FILED AUG. 31, 1908.
928,025.
Patented July 13, 1909.
5 SHEETS—SHEET 5.
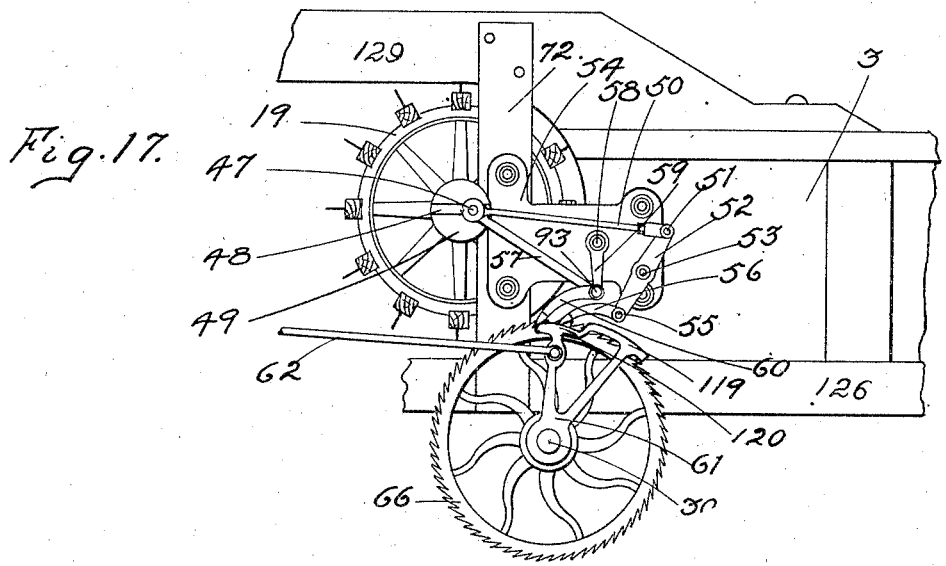
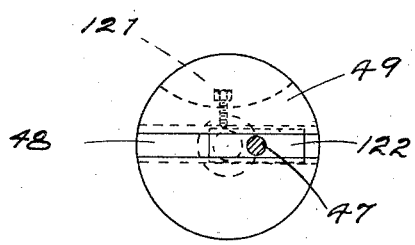
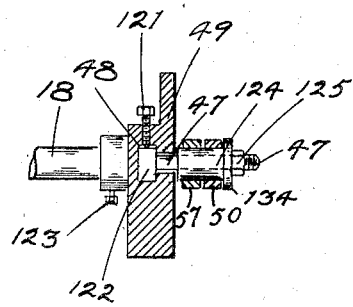
WITNESSES:
H. B. Burr
O. D. Young
INVENTORS:
Eugene Buswell & Thomas Cascaden Jr.
BY
G. C. Kennedy.
ATTORNEY

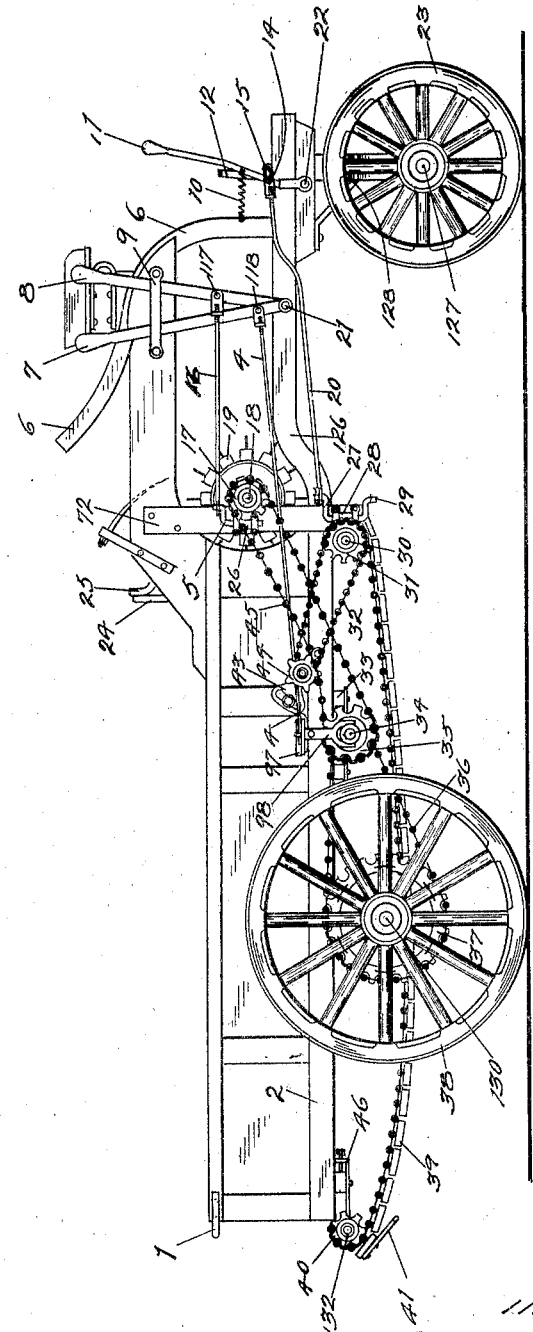

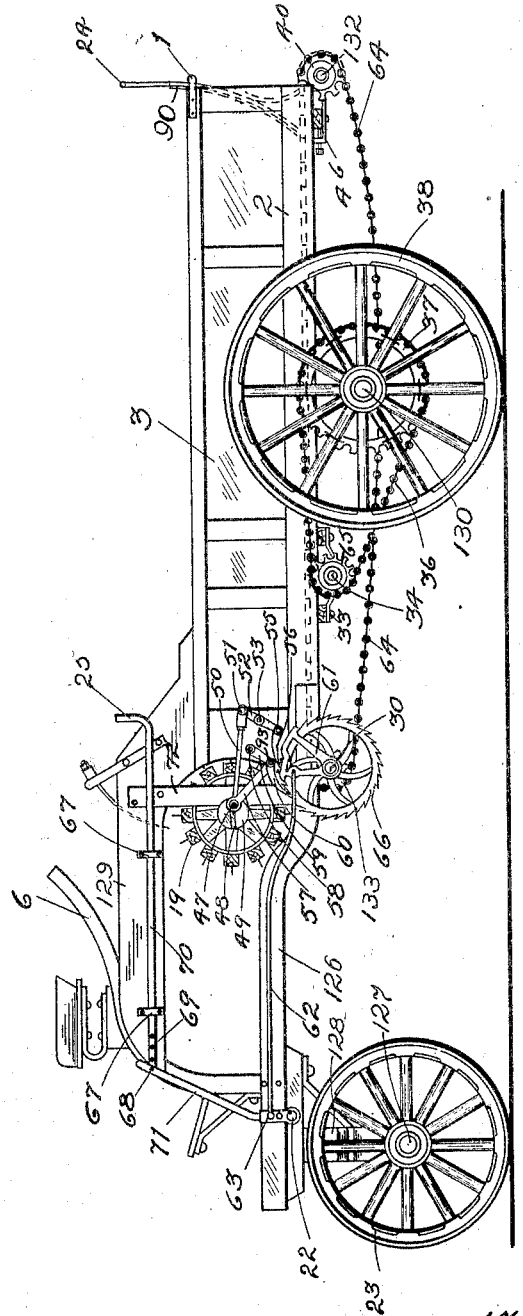

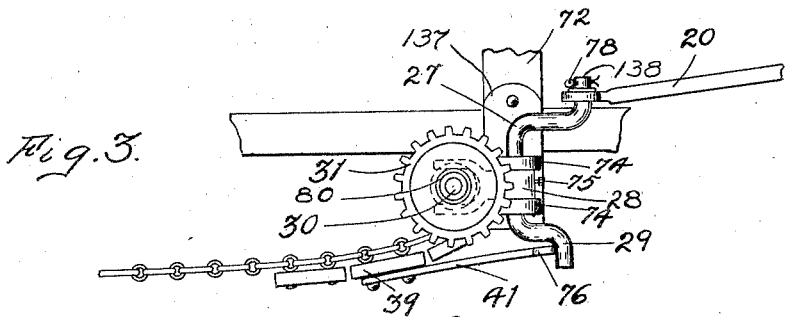
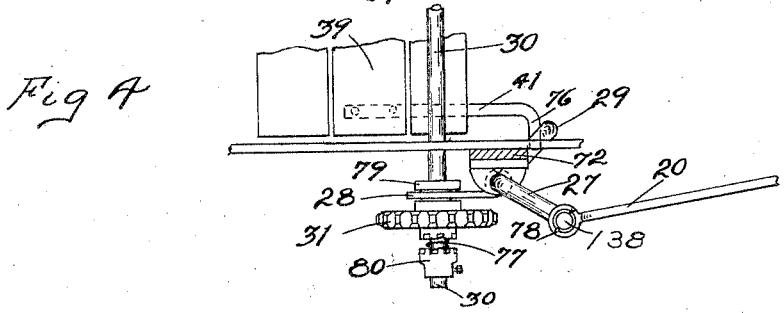
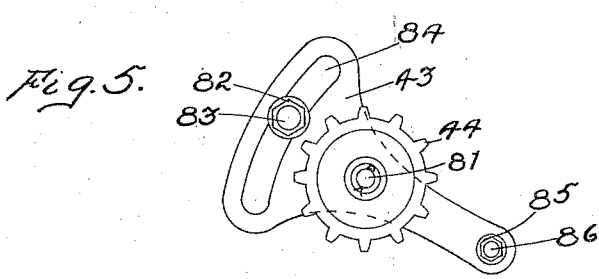
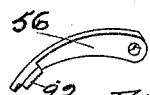
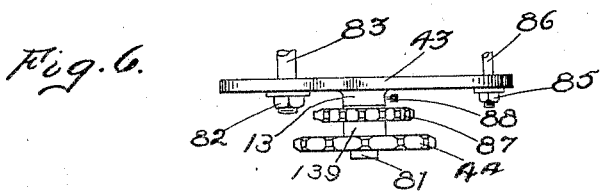

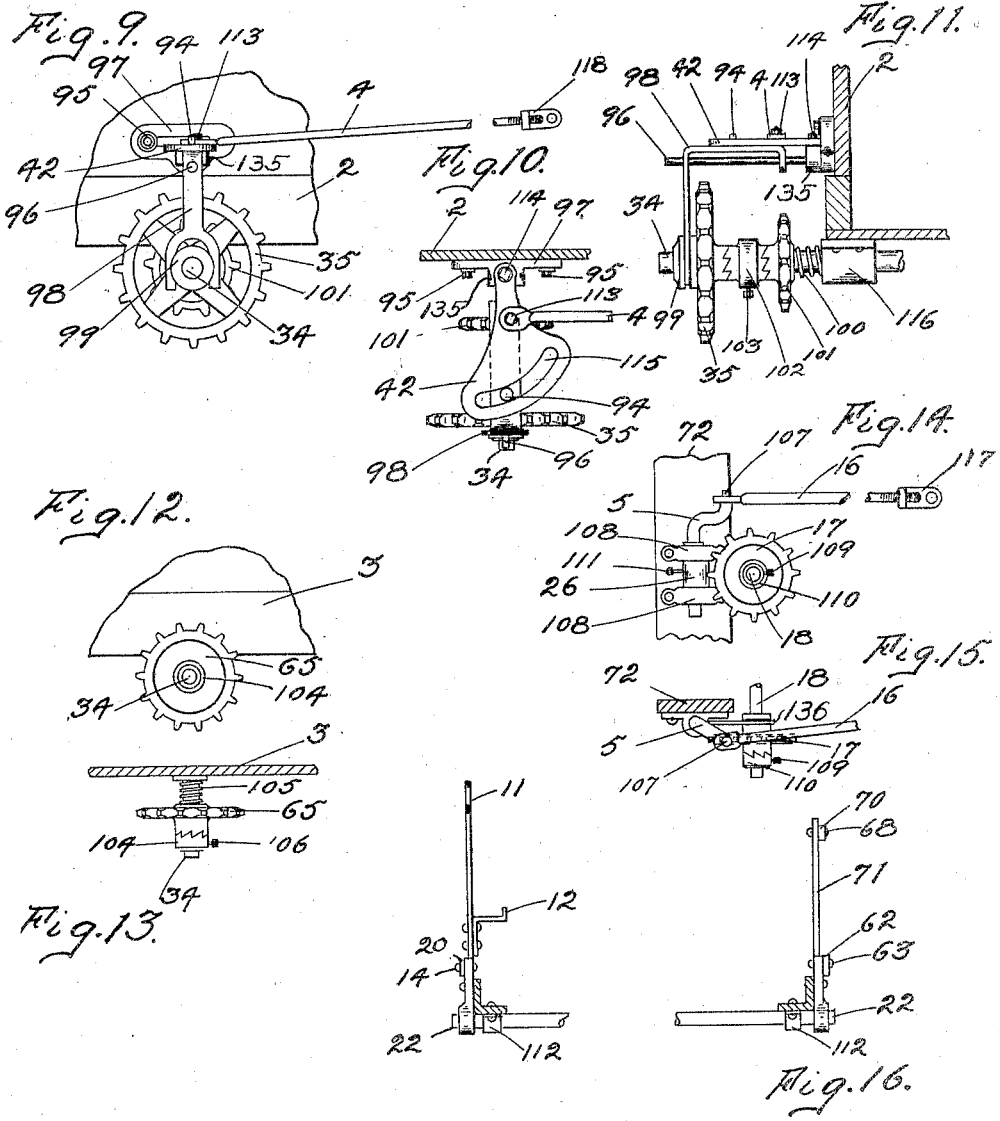

UNITED STATES PATENT OFFICE.

EUGENE BUSWELL AND THOMAS CASCADEN, JR., OF WATERLOO, IOWA; SAID BUSWELL ASSIGNOR TO SAID CASCADEN, JR.

FERTILIZER-DISTRIBUTER.

No. 928,025.  Specification of Letters Patent.  Patented July 13, 1909.

Application filed August 31, 1908. Serial No. 450,975.

*To all whom it may concern:*

Be it known that we, EUGENE BUSWELL and THOMAS CASCADEN, Jr., citizens of the United States of America, and residents of Waterloo, Blackhawk county, Iowa, have invented certain new and useful Improvements in Fertilizer-Distributers, of which the following is a specification.

Our invention relates to improvements in fertilizer distributers, and the particular objects of our improvements are as follows: First; to so construct the forward portion of the distributer-frame and receptacle adjacent to the forward carrying-wheels that such wheels may easily turn with their pivoted axle underneath, but also permitting of such receptacle being hung so low as to render the labor of manually filling it less by reason of the decrease in its height above the ground. Second; to supply coacting devices adapted to reverse the movement of the apron. Third; to provide a simple, strong and effective throw-off or disconnecting device wherewith to independently throw the whole machine out of gear. Fourth: to cause the apron-driving means to be capable of adjustment and more effective in practice, and fifth, to otherwise improve the construction in its adjustable features as well as in its coacting details. These objects we have accomplished by the means and mechanism which is hereinafter fully described and claimed, and which is illustrated in the accompanying drawings, in which:

Figure 1 is a right-hand side elevation of our improved fertilizer distributer. Fig. 2 is a left-hand side elevation thereof. Fig. 3 is an enlarged detail side elevation of the coacting devices for reversing the direction of motion of the conveyer-apron. Fig. 4 is a plan view thereof. Fig. 5 is an enlarged detail side elevation of the adjustable bracket adapted to carry the sprocket-wheels which drive the conveyer-apron in its reversed movement. Fig. 6 is a plan view thereof. Fig. 7 is a perspective detail of one of the driving pawls, and Fig. 8 is a perspective detail of the other driving-pawl. Fig. 9 is an enlarged detail side elevation of the disconnecting means for discontinuing the action of the whole machine. Fig. 10 is a plan view thereof. Fig. 11 is a front elevation thereof. Fig. 12 is a side elevation of the driven-sprocket on the left-hand end of the power-shaft. Fig. 13 is a plan view thereof and of its means for lateral adjustment along said shaft. Fig. 14 is an enlarged detail side elevation of the throw-off device for the distributing-drum and conveyer-apron when it is desired to thereafter reverse the movement of said apron without disconnecting the driving sprocket-chain from the power-shaft. Fig. 15 is a plan view thereof. Fig. 16 is a detail plan view of the forward rock-shaft and its connections. Fig. 17 is an enlarged detail side elevation of the pawl-and-ratchet driving-mechanism for the conveyer-apron. Fig. 18 is an enlarged detail of the adjusting-device for the driving-pitmen of the pawl-and-ratchet driving-mechanism aforesaid. Fig. 19 is a transverse section of the crank-disk of said adjusting-device.

Similar numbers refer to similar parts throughout the several views.

The fertilizer distributer shown is adapted for delivery of its contents at or near the forward end of the wagon-box 3. The parallel longitudinal beams 2 of the box frame have extension beams 126 secured thereto projecting forward, and the major part of whose forward length is at a higher level than the level of the beams 2. The rear of the box 3 is supported by the carrying-wheels 38 rotatable on the fixed axle 130, while the forward part of the distributer and beams 126 is supported on carrying-wheels 23 rotatable on the ends of an axle 127 medially pivoted to the fixed bolster 128. The forward wheels are located a sufficient distance in advance of the distributer-drum 19, the latter being mounted on a rotatable axle 18 which is supported by the risers 72 connected between the beams 126 and the extension sides 129, the latter being spaced away from the beams 126 to permit the drum to deliver therebetween as well as downward in advance between said beams. A transverse rearwardly-curved shield 6 is secured to the front part of the beams 126, and spaced away from said distributing-drum, and supports the driver's seat, while it also acts as a stop or deflector for material ejected forwardly and upwardly by said drum, causing the material to fall down between the beams 126. The object of placing the forward portions of the beams 126 at a higher altitude than the frame-beams 2, is to permit the forward wheels 23 to swing thereunder, while at the same time permitting the beams 2 and box 3 to be supported so low as to cause a great saving of time and labor in the manual loading of the box, obviating a considerable portion of the lift in the throwing of material into the box from the ground.

The box 3 is of a well-known type otherwise, and contains a flexible conveyer-apron composed of transverse slats 39 secured to the links of parallel longitudinal endless sprocket-chains 64. The forward ends of the chains 64 are driven by sprockets 133 mounted on a transverse rotatable shaft 30 below and a little to the rear of the distributing-drum. The rear ends of said chains move over idler-sprockets 40 mounted on a transverse rotatable shaft 132 set in adjustable bracket-bearings 46.

A ratchet-wheel 66 is mounted on the left-hand end of said shaft 30. Referring to Figs. 17 to 19 inclusive, also Figs. 7 and 8, which illustrate the details of the ratchet-driving mechanism, a solid disk 49 is secured to the left-hand end of the distributing-drum shaft 18 by means of a set-screw 123 working through its hub. A diametrical rectangular opening 48 is located through said disk, with one side having a communicating opening of less width on its left-hand side. A slide-block 122 is adapted to slide in this opening 48, and to be secured in a desired adjusted position therein by means of a set-screw 121. A stud 47 projects outwardly from said slide-block through the groove communicating with the opening 48 a sufficient distance to receive thereon the perforated sleeve 124 and a lock-nut 125. The perforated ends of the levers 57 and 50 work upon the sleeve 124 and are retained thereon by the fillet 134. When the slide 122 is adjusted in either direction in the opening 48, the effect is to correspondingly vary the length of stroke of the levers 57 and 50, the stud 47 acting as a crank-pin upon them.

60 and 56 are driving-pawls engaging the teeth of the ratchet-wheel 66. The pawl 60 is pivoted at 93 to the lower end of a swinging lever 59 whose upper end is pivoted at 58 to the box 3. The pawl 56 is pivoted at 55 to the lower end of a lever 52 which is medially pivoted at 53 to said box or to a bracket 54 thereon. The lever 57 is pivotally connected to both the pawl 60 and lever 59 on the same pivot-bolt 93 that they are connected with. The lever 50 is pivoted to a stud 51 on the upper member of the medially-pivoted lever 52. This manner of operatively connecting said pawls with said levers 57 and 50 occasions a reverse action of the pawls, one pawl driving while the other is clicking back over the teeth of said ratchet-wheel. In order to elevate said pawls to different heights to permit of their adjustment to vary the speed of the apron, we use adjusting means as follows. A triangular lever 61 is pivoted on the outer end of the apron-shaft 30. The outer end of this lever has its edge divided into two parts which are eccentrically curved with different radii as shown, and abruptly joined together. The pawls 60 and 56 have laterally projecting lugs 89 and 92 respectively, which extend over the lever 61, and are ordinarily spaced away therefrom. When the lever 61 is shifted forward, however, the differently spaced edges 120 and 119 come in contact with the said lugs respectively, and the pawls are lifted to a desired distance. When the pawls are lifted away from the ratchet-wheel completely, the apron is stopped, but when they are but partially lifted, the effect is to cause them to vary their driving action on the ratchet-wheel to change its rotatory speed. Thus the speed of the apron may be varied.

A connecting-rod 62 has its rear end pivoted to the lever 61, while its forward end is pivoted on a stud 63 on the lever 71, the lower end of the latter being secured to the left-hand end of a rock-shaft 22 which is hung in bearings 112 on the frame of the front end of spreader. The numeral 67 designates brackets or slideways alined on the outer side of the left-hand extension board 129, in which a rod 70 is slidable. The rear end of said rod is upturned at 25 for a purpose to be described, while the forward end has a plurality of alined holes 69 to adapt said rod for adjustable connection pivotally on the pin 68 extending from the upper end of the lever 71. A pusher 90 is secured to the rear end of the apron 39, and is limited in its rearward movement by a transverse bar 1 whose forwardly turned ends are secured to the sides 3. A rod 24 having an outwardly turned upper end projects from the pusher 90, and when the pusher has arrived at a point near its forward limit of movement, the rod 24 contacts with and drives forward the projection 25 on the rod 70, with the connections between said rod and the lever 61, and the latter lifts the pawls 60 and 56 clear from the ratchet-wheel, thus stopping the movement forward of the apron, automatically.

Sprocket-rims 37 are secured to each of the rear carrying-wheels 38 on their inner faces, by means of any suitable connections to the spokes. A transverse power-shaft 34 is rotatably mounted in hanging bearings 116 and 33 a little in advance of the rear-wheels 38. On the shaft 34 outside of said bearings, the sprockets 65 and 101 are mounted, and adapted to slide thereon for transverse adjustment. The outer end of the hub of each of said sprockets is furnished with ratchet teeth to engage corresponding ratchet-teeth on the inner faces of the sleeves 102 and 104 respectively, which are adjustably secured to said shaft by means of setscrews 103 and 106 respectively. Coiled springs 100 and 105 respectively are inserted between said sprockets and the bearings 116 to resiliently keep the said sprockets in engagement with the said sleeves to rotate therewith and with the shaft. The sprockets aforesaid are driven from the sprocket-rims 37 by means of the connecting sprocket-chains 36, thus driving the shaft 34.

Referring to Figs. 9 to 11 inclusive, the hub of the sprocket 35 is slidably mounted on the right-hand end of the shaft 34, and the left face of its hub is ratcheted to correspond and engage with ratchet-teeth on the outer face of the sleeve 102. The outer end 99 of the hub of said sprocket is provided with an annular groove to receive the forks of the bifurcated lower end of a downwardly-turned shifting-arm 98. A bracket 97 is secured to the wagon-box by bolts 95, and has a boss from which projects a horizontal spindle 96 extending over the shaft 34 and the sprocket 35. The shifting-arm 98 has the inner end of its horizontal portion turned down at a right angle, and both the vertical parts are orificed in line to receive the spindle 96 to slide thereover. A fan-shaped lever 42 is pivoted on a bolt 114 to the top of the boss 135, and rests upon the horizontal part of the shifting-arm 98. An eccentric arc-shaped slot 115 is provided in the broad part of said lever and receives a stud 94 which projects upward from the arm 98. The rear end of a connecting-rod 4 is pivotally connected to the arm 98 at 113, the forward end of said rod being pivotally connected to the hand-lever 7 at 118. On the same stud 21 are pivoted the lower ends of the hand-levers 7 and 8, both working in a rack 9.

17 is a sprocket whose hub is mounted for lateral adjustment on the right-hand end of the shaft 18, as shown in Figs. 14 and 15. The right-hand face of said hub is ratcheted to engage with ratchet-teeth on the left-hand face of a sleeve 110 which is adjustably secured to said shaft by means of a set-screw 109. The left-hand end of said hub has an annular groove in which is seated the forks 136 extending from a sleeve 26, the latter being secured to a rock-shaft 5 by means of a set-screw 111. The rock-shaft 5 works in bracketed bearings 108, and its upper end has a crank which is pivotally connected at 107 to the rear end of a connecting-rod 16, whose forward end is pivotally connected to a stud 117 on the lever 8. By means of the lever 8 the sprocket 17 may be shifted out of engagement with the sleeve 110 to stop rotation of the distributing-drum and the apron. A sprocket-chain 45 connects the sprockets 35 and 17. Either the hand-lever 7 or the lever 8 may be shifted to stop the movement of the distributing-drum and the feeding motion of the apron, but in practice only the lever 7 is used when it is desired to finally stop all parts of the mechanism, by disconnecting the sprocket 35 from its clutch 102. The lever 8 is used to stop the action of the drum and the feeding motion of the apron, when it is desired to return the apron, without stopping the movement of the sprocket-chain 45. The shifting device shown in Fig. 10 occupies but little space, and has a direct action, while the sliding of the shifting-arm 98 on a fixed spindle 96 insures exact action of the parts without spreading or slackness.

The return of the apron is accomplished by the following mechanism. Referring to Figs. 3 to 6 inclusive, 31 is a sprocket slidably mounted on the right-hand end of the apron-shaft 30. The right-hand face of its hub 79 is ratcheted to engage with teeth on the left-hand face of a sleeve 80 which is adjustably secured to said shaft by means of a set-screw. The left-hand portion of the hub 79 has an annular groove in which is seated the forks of an arm extending from a sleeve 28, the latter being secured to a rock-shaft 27 by means of a set-screw 75. The rock-shaft works in bearings 74 on a bracket 137 secured to the upright 72.

The upper end of the shaft 27 has a crank 138 to which the rear end of a connecting-rod 20 is pivoted and secured by a split-key 78. The lower end of said shaft 27 has a crank 29, which however, is turned inward at a different angle horizontally from the crank 138, so as to ordinarily lie in the plane of movement of the out-turned end 76 of a contact arm 41, the latter being secured to an end of one of the cleats 39 near the forward portion of the apron. The adjacent faces of the hub 79 and the sleeve 80 are cupped to receive the spring 77, which tends to keep them apart except when pushed together by the following means. A hand-lever 11, having an intermediate foot-pedal 12, has its lower end secured to the right-hand end of the rock-shaft 22. A tension-spring 10 is connected between said lever and the lower part of the shield 6. A stud 14 on said lever is received within a slot 15 in the forward end of the connecting-rod 20, to slide therein. When the lever 11 is thrown forward, the rod 20 turns the rock-shaft 27, which throws the crank 29 inward into the plane of movement of the contact-arm 41, while the shifting-arm 28 drives the sprocket 31 into engagement with the clutch-sleeve 80. The numeral 43 designates a vertically-adjustable bracket whose forward end has a connection with the wagon-box by means of a bolt 86 and nut 85. The widened rear end of said bracket has an arc-shaped slot 84 concentric with said bolt 86, adapted to receive the bolt 83 extending from said box, and by means of a lock-nut 82 the bracket may, after being swung a desired amount on the bolt 86 as a pivot, be adjusted in position vertically as desired. A boss 13 extends from the bracket 43 and is orificed centrally to receive a laterally-adjustable spindle 81, the latter being secured by means of a set-screw 88. On one and the same hub 139 the sprockets 44 and 87 are secured, the said hub being rotatably mounted on said spindle 81. The sprocket 44 engages the sprocket-chain 45, while a sprocket-chain 32 connects the sprockets 87 and 31.

When the forward movement of the apron has been stopped by either the use of the hand-lever 8, or the automatic action of the contact-arm 24 in lifting by means of the intermediate connections the pawls 60 and 56 away from the ratchet-wheel 66, and it is desired to return the apron, and the lever 11 has been shifted to engage the sprocket 31 with its clutch 80, the moving sprocket-chain 45 sets the sprocket 31 in motion, turning rearwardly, by means of the intermediate sprockets 44 and 87 and the sprocket-chain 32. When the apron has moved rearwardly to a point where the forward part of the apron has passed under the box to a position where the contact-arm 41 can engage the crank 29 with its outturned end 76, the shaft 27 is rocked so as to cause the forked arm 28 to draw the sprocket 31 out of engagement with its clutch 80, the apron then stopping, and said sprocket running idly. The lever 11 being permitted to resume its rearward position, the driving-pawls are dropped into operative engagement with the ratchet-wheel 66, by means of said rock-shaft 22 and the other described connections and the apron moves forward, if the sprocket 17 has not been disconnected, in which event, the lever 8 is shifted to reëngage such sprocket with its clutch-sleeve. The slot 15 in the forward end of the connecting-rod 20 permits the lever 11 to be moved forward to elevate the driving-pawls from the ratchet-wheel before the sprocket 31 is engaged, by reason of the continued shifting forward of said lever, with its clutch-sleeve 80 to cause a return movement of the apron.

The lateral adjustments of the working sprockets of our machine permit the mechanism to be transferred from one set to another of running-gear, or to be used with different widths of boxes, as does the adjustment of the brackets of such sprockets permit of fitting them to work properly when different heights of bolsters are used.

It is obvious that the above described mechanism could, with propriety, and without departing from the scope of our invention, be so arranged as to operate a fertilizer-distributer which delivers at its rear end, and it is our intention that slight variations in construction in any of the working parts or their mountings or supports shall be covered and included in our invention.

Having described our invention, what we claim as new, and desire to secure by Letters Patent, is:

1. In a fertilizer distributer, in combination, a wagon-box mounted on carrying-wheels, a movable apron in said box, a rotatable shaft adapted to drive said apron, a ratchet-wheel secured to said shaft, a rotatable crank having a crank-pin, an arm pivoted to said crank-pin, a driving-pawl pivoted to said arm and adapted to operatively engage the teeth of said ratchet-wheel, a pivoted-lever adapted to engage and lift said pawl, a rock-shaft, a crank-arm secured thereto, a connecting-rod between said crank-arm and said pivoted lever, a hand-lever secured to said rock-shaft, a sprocket-wheel slidable along said apron-shaft and having one face of its hub dentated, a longitudinally-adjustable sleeve removably secured on said apron-shaft and having its face nearest said sprocket-wheel cupped, and dentated to intermesh with the detents on the hub of said wheel, a compression-spring mounted on said apron-shaft between said sprocket-wheel and said sleeve, means for rotating said sprocket-wheel in a direction adapted to drive said apron in a reversed direction, a vertical rock-shaft having an inwardly-cranked lower end and an outwardly-cranked upper end, an arm secured to said rock-shaft having a bifurcated end whose forks engage the hub of said sprocket-wheel, a contact-arm projecting from the forward portion of said apron and adapted to engage and push outwardly the lower cranked end of said rock-shaft, when said apron has nearly approached one limit of its movement to disengage said sprocket-wheel from said sleeve, and a connecting-rod pivoted to the upper cranked end of said rock-shaft, and slidably-connected to said hand-lever whereby when said hand-lever is shifted in one direction it causes said pivoted-lever to lift said driving-pawl away from said ratchet-wheel ere it causes said sprocket-wheel to intermesh with the said detented sleeve.

2. In a fertilizer distributer, in combination, a wagon-box mounted on carrying-wheels, a movable apron in said box, a rotatable shaft adapted to drive said apron, a ratchet-wheel secured to said shaft, a rotatable crank having a crank-pin, an arm pivoted to said crank-pin, a driving-pawl pivoted to said arm and adapted to operatively engage the teeth of said ratchet-wheel, a pivoted lever whose free end is adapted to swing against and lift said pawl, a rock-shaft, a crank-arm secured thereto, a connecting-rod between said crank-arm and said pivoted lever, a hand-lever secured to said rock-shaft, a sprocket-wheel slidable on said apron-shaft and provided with detents on one face of its hub, means for rotating said sprocket-wheel in one direction only, a sleeve secured to said apron-shaft and having detents adapted to intermesh with the detents on said sprocket-wheel hub, a shifting-lever engaging said sprocket-wheel and fulcrumed to said box, a connecting-rod between said shifting-lever and the hand-lever on said rock-shaft, an adjustable-bracket on said wagon-box provided with a projecting spindle, a driving and a driven sprocket fixedly connected together and rotatable on said spindle, and a sprocket-chain connecting said driven-sprocket and the sprocket on said apron-shaft.

3. In a fertilizer distributer, in combination, a wagon-box mounted on carrying-wheels, a movable apron in said box, a rotatable shaft adapted to drive said apron, a ratchet-wheel secured to said shaft, a rotatable crank having a crank-pin, an arm pivoted to said crank-pin, a driving-pawl pivoted to said arm and adapted to operatively engage the teeth of said ratchet-wheel, a pivoted lever adapted to engage and lift said pawl, a rock-shaft, a crank-arm secured thereto, a connecting-rod between said crank-arm and said pivoted lever, a hand-lever secured to said rock-shaft, a sprocket-wheel slidable along said apron-shaft and having one face of its hub dentated, a longitudinally-adjustable sleeve removably secured on said apron-shaft and having its face nearest said sprocket-wheel cupped, and dentated to intermesh with the detents on the hub of said wheel, a compression-spring mounted on said apron-shaft between said sprocket-wheel and said sleeve, a vertical rock-shaft having an inwardly-cranked lower end and an outwardly-cranked upper end, an arm secured to said rock-shaft having a bifurcated end whose forks engage the hub of said sprocket-wheel, a contact-arm projecting from the forward portion of said apron and adapted to engage and push outwardly the lower cranked end of said rock-shaft, when said apron has nearly approached one limit of its movement to disengage said sprocket-wheel from said sleeve, a connecting-rod pivoted to the upper cranked end of said rock-shaft, and slidably-connected to said hand-lever whereby when said hand-lever is shifted in one direction it causes said connecting-means to lift said driving-pawl away from said ratchet-wheel ere it causes said sprocket-wheel to intermesh with the said detented sleeve, an adjustable bracket on said wagon-box provided with a projecting spindle, a driving and a driven sprocket fixedly connected together and rotatable on said spindle, and a sprocket-chain connecting said driven sprocket and the sprocket on said apron-shaft.

4. In a fertilizer distributer, in combination, a wagon-box mounted on carrying-wheels, a distributing-drum mounted on a rotatable shaft at one end of said box, a rotatable power shaft, a collar on said shaft having one end dentated, a slidable sprocket-wheel on said power-shaft having one end of its hub dentated to intermesh with said dentated collar and its hub provided with an annular groove, a bracket on said box having a projecting spindle, a bifurcated slide having its forks seated in the annular groove in said sprocket-hub and having its body suitably formed to slide laterally upon said spindle and also being provided with engaging means, a swing-plate pivoted to said bracket adjacent to said forked slide and containing means adapted to movably receive the engaging means on said slide, means for shifting the position of said swing-plate, a sprocket-wheel on said distributing-drum shaft, and a sprocket-chain connecting the last-mentioned sprocket-wheel and the said sprocket-wheel on said power-shaft.

5. In a fertilizer distributer, in combination, a wagon-box mounted on carrying-wheels, a distributing-drum mounted on a rotatable shaft at one end of said box, a rotatable power shaft, a collar on said shaft having one end dentated, a slidable sprocket-wheel on said power-shaft having one end of its hub dentated to intermesh with said dentated collar and its hub provided with an annular groove, a bracket on said box having a projecting spindle, a bifurcated slide having its forks seated in the annular groove in said sprocket-hub and having its body suitably formed to slide laterally upon said spindle and also being provided with a projecting stud on its upper surface, a swing-plate pivoted to said bracket over said forked slide and containing an eccentric arc-shaped vertical slot adapted to movably receive the stud on said slide, a hand-lever, a connecting-rod between said hand-lever and said swing-plate, a slidable sprocket-wheel on said distributing-drum shaft, having dentations on one face of its hub and an annular groove in its hub, a dentated sleeve secured to said drum-shaft adapted to intermesh with the dentations on said sprocket-wheel, bearing-brackets on said wagon-box, a rock-shaft seated in said bearings having a cranked upper end, a shifting-arm projecting from said rock-shaft provided with a fork whose members are seated in the annular groove in said sprocket-wheel hub, a hand-lever pivoted to said box, and a connecting-rod between said hand-lever and the crank on said rock-shaft.

6. In a fertilizer distributer, in combination, a wagon-box mounted on carrying-wheels, a distributing-drum mounted on a rotatable shaft at one end of said box, a rotatable power-shaft, a laterally-adjustable collar on said shaft having one end dentated, a slidable sprocket-wheel on said power-shaft having one end of its nub dentated to intermesh with said dentated collar and its hub provided with an annular groove, a bracket on said box having a projecting spindle, a bifurcated slide having its forks seated in the annular groove in said sprocket-hub and having its body suitably formed to slide laterally upon said spindle and also being provided with a projecting stud, a swing-plate pivoted to said bracket over said forked slide and containing an eccentric arc-shaped slot adapted to movably receive the stud on said slide, a hand-lever, a connecting-rod between said hand-lever and said swing-plate, a slidable sprocket-wheel on said distributing-drum shaft, having dentations on one face of its hub and an annular groove in its hub, a laterally-adjustable dentated sleeve secured to said drum-shaft adapted to intermesh with the dentations on said sprocket-wheel, bearing-brackets on said wagon-box, a rock-shaft seated in said bearings having a cranked upper end, a shifting-arm projecting from said rock-shaft provided with a fork whose members are seated in the annular groove in said sprocket-wheel hub, a hand-lever pivoted to said box, and a connecting-rod between said hand-lever and the crank on said rock-shaft.

7. In a fertilizer-distributer, in combination, a wagon-box mounted on carrying-wheels, a distributing-drum mounted on a rotatable shaft at one end of said box, a rotatable power-shaft, a driving sprocket-wheel, a driven sprocket-wheel slidable on said power-shaft, a sprocket-chain connecting said driving and driven sprocket-wheels, a laterally-adjustable collar dentated on both ends secured to said power-shaft, one face of the hub of said driven-sprocket being dentated to intermesh with one dentated face of said collar, a compression-spring seated about said power-shaft between the wagon-box and said driven sprocket-wheel, a slidable sprocket-wheel on said power-shaft having one end of its hub dentated to intermesh with the other dentated end of said collar and its hub provided with an annular groove, a bracket on said box having a projecting spindle, a bifurcated slide having its forks seated in the annular groove in said sprocket-hub and having its body suitably formed to slide laterally upon said spindle and also being provided with a projecting stud on its upper surface, a swing-plate pivoted to said bracket over said forked slide and containing an eccentric arc-shaped slot adapted to movably receive the stud on said slide, a hand-lever, a connecting-rod between said hand-lever and said swing-plate, a sprocket-wheel on said distributing-drum shaft, and a sprocket-chain connecting the last-mentioned sprocket-wheel and the said sprocket-wheel on said power-shaft.

8. In a fertilizer distributer, in combination, a wagon-box mounted on carrying-wheels, a distributing-drum mounted on a rotatable shaft at one end of said box, a rotatable power-shaft, a slidable rotatable sprocket-wheel on said power-shaft having one end of its hub provided with ratchet-teeth, a collar secured to said shaft having ratchet-teeth adapted to intermesh with the ratchet-teeth on said sprocket-wheel to prevent rotation of said wheel in one direction, resilient means engaging said sprocket-wheel and adapted to keep its said ratchet-teeth in mesh with the said ratchet-teeth on said collar, another sprocket-wheel secured to said power-shaft, a slidable sprocket-wheel on said distributing-drum shaft, having detents on one face of its hub and an annular groove in its hub, a dentated sleeve secured to said drum-shaft and adapted to intermesh with the detents on said sprocket-wheel, bearing-brackets on said wagon-box, a rock-shaft in said bearings having a crank, a shifting-arm projecting from said rock-shaft having a fork whose members are seated in the groove in said sprocket-wheel hub, a hand-lever pivoted to said box, and connecting-means between said hand-lever and the crank on said rock-shaft, and a sprocket-chain operatively connecting the second-mentioned sprocket-wheel on said distributing-drum shaft.

9. In a fertilizer distributer, in combination, a wagon-box mounted on carrying-wheels, an apron in said box adapted for forward and back movement, a rotatable shaft adapted to drive said apron, a sprocket-wheel slidable along said shaft, a sleeve secured to said shaft, said sprocket-wheel and sleeve provided on their adjacent sides with like-shaped mating clutch members, means for rotating said sprocket-wheel in one direction, a rock-shaft having cranks at its upper and lower ends, an arm projecting from said rock-shaft having a bifurcated end adapted to engage said sprocket-wheel, engaging-means on said apron adapted to engage and move one of the cranks on said rock-shaft to rock the latter in a certain direction when said apron has nearly approached one limit of its movement to disengage said sprocket-wheel from said sleeve, a hand-lever, and a connecting-rod between said hand-lever and the other crank on said rock-shaft.

10. In a fertilizer distributer, in combination, a wagon-box mounted on carrying-wheels, a movable apron in said box, a rotatable shaft adapted to drive said apron, a sprocket-wheel slidable along said shaft, a sleeve secured to said shaft, said sprocket-wheel and sleeve provided on their adjacent sides with like-shaped mating clutch members, a shifting-lever engaging said sprocket-wheel and fulcrumed to said box, a spindle adjustably mounted on said box, coupled driving- and driven-sprockets rotatable together on said spindle, a sprocket-chain connecting said driven-sprocket and the sprocket on said apron-shaft, a rotatable power-sprocket, and a sprocket-chain operatively connecting said power-sprocket, and the driving-sprocket coupled to said driven sprocket on said spindle.

11. In a fertilizer distributer, in combination, a wagon-box mounted on carrying-wheels, a movable apron in said box, a rotatable shaft adapted to drive said apron, a sprocket-wheel slidable along said shaft, a sleeve secured to said shaft, said sprocket-wheel and sleeve provided on their adjacent sides with like-shaped mating clutch members, a compression-spring between and engaging said sprocket-wheel and sleeve, a shifting-lever engaging said sprocket wheel and fulcrumed to said box, a spindle adjustably mounted on said box, a driving-sprocket rotatable on said spindle, and a sprocket-chain connecting said driving-sprocket and the slidable sprocket-wheel on said shaft.

Signed at Waterloo, Iowa, this 12th day of Aug. 1908.

EUGENE BUSWELL.
THOMAS CASCADEN, Jr.

Witnesses:
G. C. KENNEDY,
O. D. YOUNG.